(12) United States Patent
Shen et al.

(10) Patent No.: US 7,702,796 B2
(45) Date of Patent: Apr. 20, 2010

(54) RECOVERING A POOL OF CONNECTIONS

(75) Inventors: Jinmei Shen, Rochester, MN (US); Hao Wang, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 584 days.

(21) Appl. No.: 11/419,066

(22) Filed: May 18, 2006

(65) Prior Publication Data

US 2007/0268910 A1 Nov. 22, 2007

(51) Int. Cl.
*G06F 15/16* (2006.01)
*G06F 15/173* (2006.01)
*H04L 12/28* (2006.01)

(52) U.S. Cl. .................. 709/227; 709/226; 709/242; 370/395.21

(58) Field of Classification Search .................. 709/227
See application file for complete search history.

(56) References Cited

U.S. PATENT DOCUMENTS

| | | | | |
|---|---|---|---|---|
| 6,115,393 A * | 9/2000 | Engel et al. | ................. | 370/469 |
| 6,173,311 B1 * | 1/2001 | Hassett et al. | ................ | 709/202 |
| 6,338,089 B1 * | 1/2002 | Quinlan | ...................... | 709/227 |
| 6,941,379 B1 * | 9/2005 | Dingsor et al. | .............. | 709/235 |
| 7,089,565 B2 * | 8/2006 | Kan et al. | .................... | 719/315 |
| 2003/0135542 A1 * | 7/2003 | Boudreau | .................... | 709/203 |
| 2003/0187991 A1 * | 10/2003 | Lin et al. | ..................... | 709/227 |
| 2004/0019680 A1 * | 1/2004 | Chao et al. | .................. | 709/226 |
| 2004/0088413 A1 * | 5/2004 | Bhogi et al. | ................. | 709/226 |
| 2004/0205180 A1 * | 10/2004 | Srivastava et al. | ........... | 709/223 |
| 2004/0221031 A1 * | 11/2004 | Desai | ......................... | 709/224 |
| 2005/0038801 A1 * | 2/2005 | Colrain et al. | .............. | 707/100 |
| 2007/0244987 A1 * | 10/2007 | Pedersen et al. | ............ | 709/217 |

OTHER PUBLICATIONS

IBM; "IBM WebSphere Application Server, Version 5.1: Resources"; Dec. 15, 2003; IBM; pp. 1, 2, 16, 33.*
Deb Erickson, Shawn Lauzon, and Melissa Modjeski; "WebSphere Connection Pooling"; Aug. 2001; IBM; p. 55.*

* cited by examiner

*Primary Examiner*—Ario Etienne
*Assistant Examiner*—Blake Rubin
(74) *Attorney, Agent, or Firm*—Owen J. Gamon

(57) ABSTRACT

In an embodiment, in response to a request, a connection is selected from a pool of connections to a server. If the connection is stale and the number of stale connections encountered is greater than an adaptive threshold, then recovery is performed on all of the connections in the pool. If the number of stale connections is not greater than the adaptive threshold, then recovery is performed on the stale connection. A decision is made whether the connection is stale by sending the request to the server via the connection and detecting whether the sending encountered an error and by receiving a response from the server via the current connection and detecting whether the response indicates that the request encountered an error at the server.

16 Claims, 11 Drawing Sheets

| CONNECTION POOL | | | | | 172 |
|---|---|---|---|---|---|
| 205 | 355 | 360 | 365 | 370 | |
| CONNECTION ID | TARGET ID | ATTRIBUTES | CONNECTION AVAILABILITY | CONNECTION STATUS | |
| CONNECTION A | SERVER A | SSL | AVAILABLE | GOOD | 305 |
| CONNECTION B | SERVER A | NON-SSL | IN USE | STALE | 310 |
| CONNECTION C | SERVER A | 2-PHASE COMMIT | IN USE | GOOD | 315 |
| CONNECTION D | SERVER B | 1-PHASE COMMIT | AVAILABLE | STALE | 320 |
| CONNECTION E | SERVER B | USER ID | IN USE | STALE | 325 |
| CONNECTION F | SERVER B | SSL | AVAILABLE | GOOD | 330 |
| CONNECTION G | SERVER B | NON-SSL | IN USE | STALE | 335 |
| CONNECTION H | SERVER C | 2-PHASE COMMIT | IN USE | GOOD | 340 |
| CONNECTION I | SERVER C | 1-PHASE COMMIT | AVAILABLE | GOOD | 345 |
| CONNECTION J | SERVER C | USER ID | AVAILABLE | GOOD | 350 |

FIG. 3

| CONNECTION STATISTICS | | 174 |
|---|---|---|
| 405 | 410 | 415 |
| NUMBER OF STALE CONNECTIONS ENCOUNTERED WITHIN A TIME PERIOD | NUMBER OF GOOD CONNECTIONS ENCOUNTERED WITHIN A TIME PERIOD | RATIO OF NUMBER OF STALE TO NUMBER OF GOOD CONNECTIONS WITHIN A TIME PERIOD |
| 7 | 10 | .7 |

| 420 | 425 |
|---|---|
| ADAPTIVE THRESHOLD | TIME PERIOD |
| 6 | 25 MINUTES |

FIG. 4

| RULES | | | 178 |
|---|---|---|---|
| 525 | 530 | 535 | |
| STALE: GOOD RATIO COMPARISON STATEMENT | ADAPTIVE THRESHOLD COMPARISON STATEMENT | ADAPTIVE THRESHOLD ADJUSTMENT AMOUNT | |
| > .8 | > 2 | - 2 | 505 |
| > .6 | > 1 | - 1 | 510 |
| < .2 | N/A | + 2 | 515 |
| < .4 | N/A | + 1 | 520 |

FIG. 5

RECOVERING A POOL OF CONNECTIONS

FIELD

An embodiment of the invention generally relates to computer application servers and more specifically relates to managing a pool of connections to application servers.

BACKGROUND

The development of the EDVAC computer system of 1948 is often cited as the beginning of the computer era. Since that time, computer systems have evolved into extremely sophisticated devices, and computer systems may be found in many different settings. Computer systems typically include a combination of hardware, such as semiconductors and circuit boards, and software, also known as computer programs. As advances in semiconductor processing and computer architecture push the performance of the computer hardware higher, more sophisticated and complex computer software has evolved to take advantage of the higher performance of the hardware, resulting in computer systems today that are much more powerful than just a few years ago.

Years ago, computers were isolated devices that did not communicate with each other. But, today computers are often connected in networks, such as the Internet or World Wide Web, and a user at one computer, often called a client, may wish to access information at multiple other computers, often called servers, via a network. Accessing and using information, e.g. data, services, or other resources, from multiple computers is often called distributed computing.

A client typically accesses data and requests services at a server via a mechanism known as a "connection." Establishing (or opening) a connection at the server typically involves the setting up of resources (such as computer memory and buffers) so that a particular object, such as a database or file, can be read or written to. The server allocates these resources to a particular connection identified by a connection identifier. Requests from the client to the server include the connection identifier, and the server uses the resources associated with the connection identifier to process the requests. Once the connection is no longer needed, the client sends a close (or release) connection command to the server, which causes the server to close the connection and deallocate the associated resources.

Establishing a connection is expensive in terms of time and performance, so clients often use a technique called "connection pooling," which reuses connections instead of closing them, in order to avoid re-establishing connections. Under connection pooling, the client opens or establishes a number of connections and adds them to a pool of available connections, which various applications at the client share. When an application is done using a connection, instead of closing the connection, the client returns the connection to the available pool, which another application may then use. The overhead of closing the connection and re-opening another connection when needed is thus avoided, which improves performance of the requests.

While connection pooling has advantages, it has also has disadvantages. The longer that a connection remains in the available pool unused, the more likely that the connection will be stale and unusable when the connection is eventually needed. Connections can become stale for a variety of reasons, such as the server encountering an error, the service or data source on the server encountering an error, or the server noticing that the connection has not been used recently and, in response, closing the connection to free up the associated resources for use by another client.

Since not just individual connections but the entire pool of connections may become stale, detecting and recovering from stale connections is important, and several techniques have been used. A passive technique for managing stale connection is for the client to remove only those connections from the pool that the client actually detects are stale when the client attempts to use the connections. Unfortunately, if all of the connections in the pool are stale, the client must individually attempt to use each connection, detect that each connection is stale, and then remove each connection, which decreases performance. The worst case scenario of all connections being stale can frequently occur if all connections in the pool are for a single server because if that single server is powered off or has encountered an error, all its connections become stale.

In contrast to the passive technique, using an active technique for handling stale connections, the client detects that one connection in the pool is stale while using that connection, and in response proactively investigates all the connections in that pool prior to their use. This active technique has the problem that the client is potentially investigating connections that are good (in the worst case, every connection in the pool is good except for the one stale connection), which decreases performance with unnecessary work. The more connections per pool, and the more servers that are represented in the pool, the worse the active technique performs. Thus, neither the passive nor the active technique provides good performance in all scenarios.

What is needed is a better technique for managing stale connections in a connection pool.

SUMMARY

A method, apparatus, system, and signal-bearing medium are provided. In an embodiment, in response to a request, a connection is selected from a pool of connections to a server. If the connection is stale and the number of stale connections encountered is greater than an adaptive threshold, then recovery is performed on all of the connections in the pool. If the number of stale connections is not greater than the adaptive threshold, then recovery is performed on the stale connection. A decision is made whether the connection is stale by sending the request to the server via the connection and detecting whether the sending encountered an error and by receiving a response from the server via the current connection and detecting whether the response indicates that the request encountered an error at the server. The recovery of all of the connections in the pool includes sending a ping message to the server on each of the connections and removing the connections from the pool for which the ping message is unsuccessful. The adaptive threshold is changed by an amount specified by a rule if a ratio of the number of stale connections to a number of good connections encountered satisfies a ratio comparison statement specified by the rule.

BRIEF DESCRIPTION OF THE DRAWINGS

Various embodiments of the present invention are hereinafter described in conjunction with the appended drawings:

FIG. 3 depicts a block diagram of an example data structure for a connection pool, according to an embodiment of the invention.

FIG. 4 depicts a block diagram of a data structure for connection statistics, according to an embodiment of the invention.

FIG. 5 depicts a block diagram of an example data structure for rules, according to an embodiment of the invention.

It is to be noted, however, that the appended drawings illustrate only example embodiments of the invention, and are therefore not considered limiting of its scope, for the invention may admit to other equally effective embodiments.

DETAILED DESCRIPTION

Figure 1:
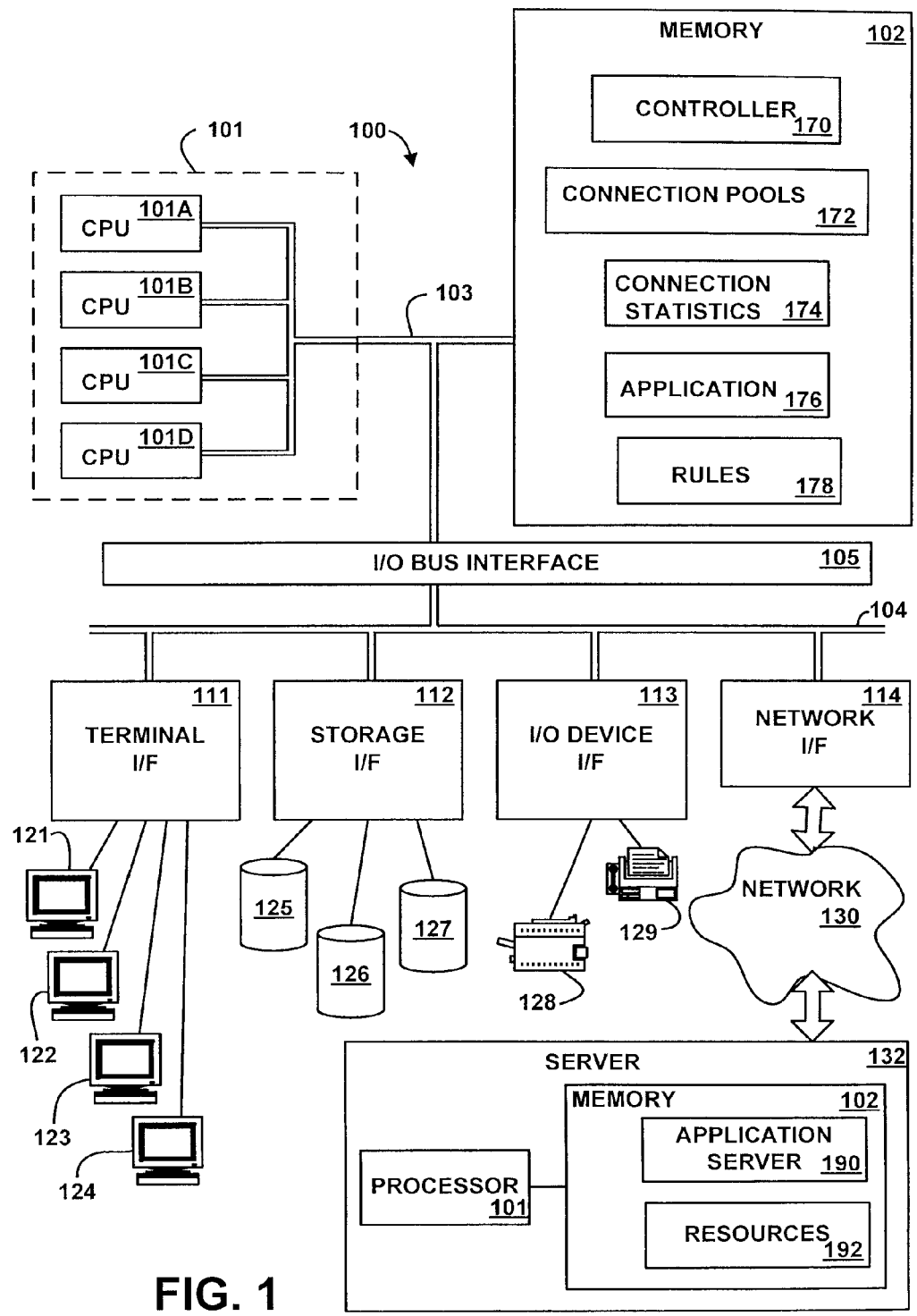
FIG. 1 depicts a high-level block diagram of an example system for implementing an embodiment of the invention.

Referring to the Drawings, wherein like numbers denote like parts throughout the several views, FIG. 1 depicts a high-level block diagram representation of a client computer system 100 connected to a server computer system 132 via a network 130, according to an embodiment of the present invention. The terms "client" and "server" are used herein for convenience only, and in various embodiments a computer that operates as a client in one environment may operate as a server in another environment, and vice versa. In an embodiment, the hardware components of the computer systems 100 and/or 132 may be implemented by an eServer iSeries computer system available from International Business Machines of Armonk, N.Y. However, those skilled in the art will appreciate that the mechanisms and apparatus of embodiments of the present invention apply equally to any appropriate computing system.

The major components of the computer system 100 include one or more processors 101, a main memory 102, a terminal interface 111, a storage interface 112, an I/O (Input/Output) device interface 113, and communications/network interfaces 114, all of which are coupled for inter-component communication via a memory bus 103, an I/O bus 104, and an I/O bus interface unit 105.

The computer system 100 contains one or more general-purpose programmable central processing units (CPUs) 101A, 101B, 101C, and 101D, herein generically referred to as the processor 101. In an embodiment, the computer system 100 contains multiple processors typical of a relatively large system; however, in another embodiment the computer system 100 may alternatively be a single CPU system. Each processor 101 executes instructions stored in the main memory 102 and may include one or more levels of on-board cache.

The main memory 102 is a random-access semiconductor memory for storing or encoding data and programs. In another embodiment, the main memory 102 represents the entire virtual memory of the computer system 100, and may also include the virtual memory of other computer systems coupled to the computer system 100 or connected via the network 130. The main memory 102 is conceptually a single monolithic entity, but in other embodiments the main memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a controller 170, connection pools 172, connection statistics 174, an application 176, and rules 178. Although the controller 170, the connection pools 172, the connection statistics 174, the application 176, and the rules 178 are illustrated as being contained within the memory 102 in the computer system 100, in other embodiments some or all of them may be on different computer systems and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the controller 170, the connection pools 172, the connection statistics 174, the application 176, and the rules 178 are illustrated as being contained within the main memory 102, these elements are not necessarily all completely contained in the same storage device at the same time. Further, although the controller 170, the connection pools 172, the connection statistics 174, the application 176, and the rules 178 are illustrated as being separate entities, in other embodiments some of them, or portions of some of them, may be packaged together.

The application 176 sends requests to the controller 170. In various embodiments, the application 176 may include instructions capable of executing on the processor 101 or statements capable of being interpreted by instructions that execute on the processor 101. In various embodiments, the application 176 may be a user application, a third-party application, an operating system, or any portion, combination, or multiple thereof.

The controller 170 selects a connection from the connection pool 172 and sends requests to the server computer system 132 via the network 130 on the selected connection. The controller 170 further updates the connection statistics 174 and performs active or passive connection pool recovery based on the connection statistics 174 and the rules 178. The connection pools 172 are further described below with reference to FIG. 3. The connection statistics 174 are further described below with reference to FIG. 4. The rules 178 are further described below with reference to FIG. 5.

In an embodiment, the controller 170 includes instructions capable of executing on the processor 101 or statements capable of being interpreted by instructions executing on the processor 101 to perform the functions as further described below with reference to FIGS. 6, 7, 8, 9, 10, and 11. In another embodiment, the controller 170 may be implemented in microcode. In another embodiment, the controller 170 may be implemented in hardware via logic gates and/or other appropriate hardware techniques.

The memory bus 103 provides a data communication path for transferring data among the processor 101, the main memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104. The system I/O bus 104 may be, e.g., an industry standard PCI bus, or any other appropriate bus technology.

The I/O interface units support communication with a variety of storage and I/O devices. For example, the terminal interface unit 111 supports the attachment of one or more user terminals 121, 122, 123, and 124. The storage interface unit 112 supports the attachment of one or more direct access storage devices (DASD) 125, 126, and 127 (which are typically rotating magnetic disk drive storage devices, although they could alternatively be other devices, including arrays of disk drives configured to appear as a single large storage device to a host). The contents of the main memory 102 may be stored to and retrieved from the direct access storage devices 125, 126, and 127, as needed.

The I/O device interface 113 provides an interface to any of various other input/output devices or devices of other types. Two such devices, the printer 128 and the fax machine 129, are shown in the exemplary embodiment of FIG. 1, but in other embodiment many other such devices may exist, which may be of differing types. The network interface 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path among the processors 101, the main memory 102, and the I/O bus interface 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may in fact contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

The computer system 100 depicted in FIG. 1 has multiple attached terminals 121, 122, 123, and 124, such as might be typical of a multi-user "mainframe" computer system. Typically, in such a case the actual number of attached devices is greater than those shown in FIG. 1, although the present invention is not limited to systems of any particular size. The computer system 100 may alternatively be a single-user system, typically containing only a single user display and keyboard input, or might be a server or similar device which has little or no direct user interface, but receives requests from other computer systems (clients). In other embodiments, the computer system 100 may be implemented as a personal computer, portable computer, laptop or notebook computer, PDA (Personal Digital Assistant), tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support Infiniband. In another embodiment, the network 130 may support wireless communications. In another embodiment, the network 130 may support hard-wired communications, such as a telephone line or cable. In another embodiment, the network 130 may support the Ethernet IEEE (Institute of Electrical and Electronics Engineers) 802.3x specification. In another embodiment, the network 130 may be the Internet and may support IP (Internet Protocol).

In another embodiment, the network 130 may be a local area network (LAN) or a wide area network (WAN). In another embodiment, the network 130 may be a hotspot service provider network. In another embodiment, the network 130 may be an intranet. In another embodiment, the network 130 may be a GPRS (General Packet Radio Service) network. In another embodiment, the network 130 may be a FRS (Family Radio Service) network. In another embodiment, the network 130 may be any appropriate cellular data network or cell-based radio network technology. In another embodiment, the network 130 may be an IEEE 802.11B wireless network. In still another embodiment, the network 130 may be any suitable network or combination of networks. Although one network 130 is shown, in other embodiments any number of networks (of the same or different types) may be present.

The server computer system 132 may include some or all of the hardware and/or software elements previously described above for the client computer system 100. In particular, the server computer system 132 includes a processor 101 coupled to a memory 102, which stores or encodes an application server 190 and resources 192.

The application server 190 is a program that facilitates the serving (running) of other applications. In another embodiment, the application server 190 is a server computer dedicated to running an application or applications. The application server 190 allocates resources 192 to a connection identified by a connection identifier in response to an open connection request from the controller 170. The application server 190 then uses the allocated resources 192 to process future requests that specify that connection identifier. In various embodiments, the resources 192 may include memory, data structures, buffers, storage devices, cache, databases, files, records, or any other appropriate resources. In other embodiments, resources may include printers, ports, I/O devices, modems, routers, processors, or any other appropriate types of electronic devices.

In an embodiment, the application server 190 includes instructions capable of executing on the processor 101 or statements capable of being interpreted by instructions executing on the processor 101 to process requests from the clients 100. In another embodiment, the application server 190 may be implemented in microcode. In another embodiment, the application server 190 may be implemented in hardware via logic gates and/or other appropriate hardware techniques.

It should be understood that FIG. 1 is intended to depict the representative major components of the client computer system 100, the network 130, and the server computer system 132 at a high level, that individual components may have greater complexity than represented in FIG. 1, that components other than or in addition to those shown in FIG. 1 may be present, and that the number, type, and configuration of such components may vary. Several particular examples of such additional complexity or additional variations are disclosed herein; it being understood that these are by way of example only and are not necessarily the only such variations.

The various software components illustrated in FIG. 1 and implementing various embodiments of the invention may be implemented in a number of manners, including using various computer software applications, routines, components, programs, objects, modules, data structures, etc., referred to hereinafter as "computer programs," or simply "programs." The computer programs typically comprise one or more instructions that are resident at various times in various memory and storage devices in the client computer system 100, and that, when read and executed by one or more processors 101 in the client computer system 100, cause the client computer system 100 to perform the steps necessary to execute steps or elements comprising the various aspects of an embodiment of the invention.

Moreover, while embodiments of the invention have and hereinafter will be described in the context of fully-functioning computer systems, the various embodiments of the invention are capable of being distributed as a program product in a variety of forms, and the invention applies equally regardless of the particular type of signal-bearing medium used to actually carry out the distribution. The programs defining the functions of this embodiment may be delivered to the client computer system 100 via a variety of tangible signal-bearing media that may be operatively or communicatively connected (directly or indirectly) to the processor 101. The signal-bearing media may include, but are not limited to:

(1) information permanently stored on a non-rewriteable storage medium, e.g., a read-only memory device attached to or within a computer system, such as a CD-ROM readable by a CD-ROM drive;

(2) alterable information stored on a rewriteable storage medium, e.g., a hard disk drive (e.g., DASD 125, 126, or 127), CD-RW, or diskette; or (3) information conveyed to the computer system 100 by a communications medium, such as through a computer or a telephone network, e.g., the network 130.

Such tangible signal-bearing media, when encoded with or carrying computer-readable and executable instructions that direct the functions of the present invention, represent embodiments of the present invention.

Embodiments of the present invention may also be delivered as part of a service engagement with a client corporation, nonprofit organization, government entity, internal organizational structure, or the like. Aspects of these embodiments may include configuring a computer system to perform, and deploying software systems and web services that implement, some or all of the methods described herein. Aspects of these embodiments may also include analyzing the client company, creating recommendations responsive to the analysis, generating software to implement portions of the recommendations, integrating the software into existing processes and infrastructure, metering use of the methods and systems described herein, allocating expenses to users, and billing users for their use of these methods and systems.

In addition, various programs described hereinafter may be identified based upon the application for which they are implemented in a specific embodiment of the invention. But, any particular program nomenclature that follows is used merely for convenience, and thus embodiments of the invention should not be limited to use solely in any specific application identified and/or implied by such nomenclature.

The exemplary environments illustrated in FIG. 1 are not intended to limit the present invention. Indeed, other alternative hardware and/or software environments may be used without departing from the scope of the invention.

Figure 2:
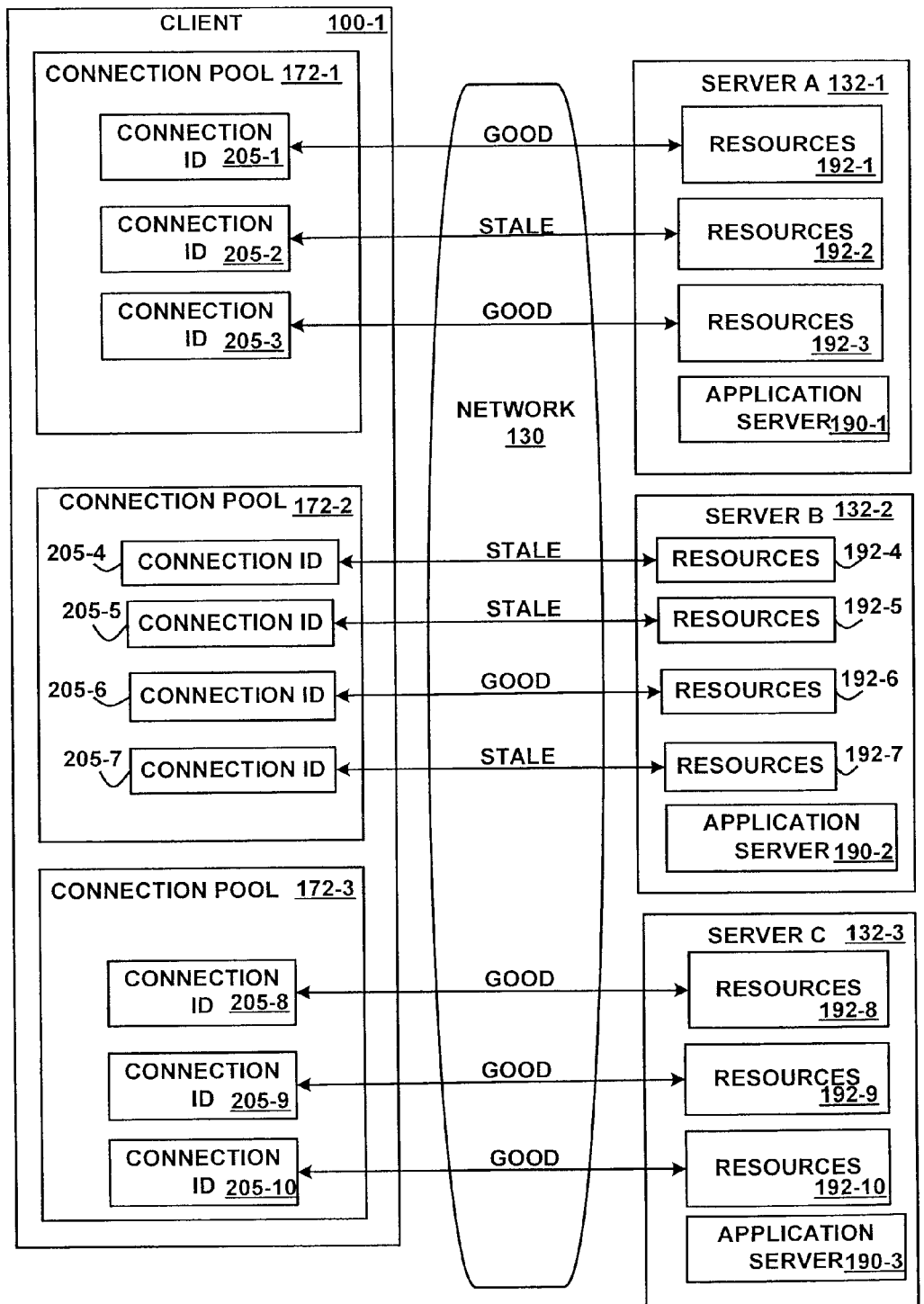
FIG. 2 depicts a block diagram of selected components of the example system, according to an embodiment of the invention.

FIG. 2 depicts a block diagram of selected components of the example system depicted in FIG. 1, according to an embodiment of the invention. A client 100-1 is illustrated connected to the servers 132-1, 132-2, and 132-3 via the network 130. The client 100-1 is an example of the client 100 (FIG. 1). The client 100-1 includes connection pools 172-1, 172-2, and 172-3, which are examples of the connection pool 172 (FIG. 1). The connection pool 172-1 includes connection identifiers 205-1, 205-2, and 205-3. The connection pool 172-2 includes connection identifiers 205-4, 205-5, 205-6, and 205-7. The connection pool 172-3 includes connection identifiers 205-8, 205-9, and 205-10. The connection identified by the connection identifier 205-1 is a good connection, the connection identified by the connection identifier 205-2 is a stale connection, the connection identified by the connection identifier 205-3 is a good connection, the connection identified by the connection identifier 205-4 is a stale connection, the connection identified by the connection identifier 205-5 is a stale connection, the connection identified by the connection identifier 205-6 is a good connection, the connection identified by the connection identifier 205-7 is a stale connection, the connection identified by the connection identifier 205-8 is a good connection, the connection identified by the connection identifier 205-9 is a good connection, and the connection identified by the connection identifier 205-10 is a good connection.

The servers 132-1, 132-2, and 132-3 are examples of the server computer system 132 (FIG. 1). The server computer system 132-1 includes resources 192-1, 192-2, and 192-3, which are examples of the resources 192 (FIG. 1). The server computer system 132-1 further includes an application server 190-1, which is an example of the application server 190 (FIG. 1). The server computer system 132-2 includes resources 192-4, 192-5, 192-6, and 192-7, which are examples of the resources 192 (FIG. 1). The server computer system 132-2 further includes an application server 190-2, which is an example of the application server 190 (FIG. 1). The server computer system 132-3 includes resources 192-8, 192-9, and 192-10, which are examples of the resources 192 (FIG. 1). The server computer system 132-3 further includes an application server 190-3, which is an example of the application server 190 (FIG. 1).

The application server 190-1 allocates the resources 192-1 to the connection identifier 205-1, allocates the resources 192-2 to the connection identifier 205-2, and allocates the resources 192-3 to the connection identifier 205-3. The application server 190-1 uses the resources 192-1 to process requests from the client 100-1 that specify the connection identifier 205-1 and prohibits requests that specify other connection identifiers (or that do not specify a connection identifier) to use the resources 192-1. The application server 190-1 uses the resources 192-3 to process requests from the client 100-1 that specify the connection identifier 205-3 and prohibits requests that specify other connection identifiers (or that do not specify a connection identifier) to use the resources 192-3. Since the connection 205-2 is stale, the application server 190-1 is unable to use the resources 192-2 to process requests that specify the connection identifier 205-2.

The application server 190-2 allocates the resources 192-4 to the connection identifier 205-4, allocates the resources 192-5 to the connection identifier 205-5, allocates the resources 192-6 to the connection identifier 205-6, and allocates the resources 192-7 to the connection identifier 205-7. The application server 190-2 uses the resources 192-6 to process requests from the client 100-1 that specify the connection identifier 205-6 and prohibits requests that specify other connection identifiers (or that do not specify a connection identifier) to use the resources 192-6. Since the connections 205-4, 205-5, and 205-7 are stale, the application server 190-2 is unable to use the resources 192-4, 192-5, and 192-7 to process requests that specify the connection identifiers 205-4, 205-5, and 205-7, respectively.

The application server 190-3 allocates the resources 192-8 to the connection identifier 205-8, allocates the resources 192-9 to the connection identifier 205-9, and allocates the resources 192-10 to the connection identifier 205-10. The application server 190-3 uses the resources 192-8 to process requests from the client 100-1 that specify the connection identifier 205-8 and prohibits requests that specify other connection identifiers (or that do not specify a connection identifier) to use the resources 192-8. The application server 190-3 uses the resources 192-9 to process requests from the client 100-1 that specify the connection identifier 205-9 and prohibits requests that specify other connection identifiers (or that do not specify a connection identifier) to use the resources 192-9. The application server 190-3 uses the resources 192-10 to process requests from the client 100-1 that specify the connection identifier 205-10 and prohibits requests that specify other connection identifiers (or that do not specify a connection identifier) to use the resources 192-10.

FIG. 3 depicts a block diagram of an example data structure for a connection pool 172, according to an embodiment of the invention. The connection pool 172 includes example records 305, 310, 315, 320, 325, 330, 335, 340, 345, and 350. Each of the example records 305, 310, 315, 320, 325, 330, 335, 340, 345, and 350 represents a connection to an application server 190 and to resources 192 allocated to the connection. Each of the example records 305, 310, 315, 320, 325, 330, 335, 340, 345, and 350 includes an example connection identifier field 205, a target identifier field 355, an attributes field 360, a connection availability field 365, and a connection status field 370. The connection identifier 205 identifies the connection and generically represents the connection identifiers 205-1, 205-2, 205-3, 205-4, 205-5, 205-6, 205-7, 205-8, 205-9, and 205-10 (FIG. 2). The controller 170 includes the connection identifier 205 with the request that the controller 170 sends to the server computer system 132. The target identifier field 355 indicates the target server computer system 132 and may specify a network address, an IP (Internet Protocol) address, a host name, a port number, or any other appropriate identifier of the server computer system 132 and/or the application server 190.

The attributes 360 indicates attributes of the request that uses the connection. The controller 170 uses the attributes 360 to select a connection for a particular request by searching the connection pool 172 for a connection that has attributes 360 that match the attributes of the request that the controller 170 wishes to send to a server computer system 132. For example, attributes 360 of "SSL" in records 305 and 330 indicates that the controller 170 sends all requests that use Secure Socket Layer to either "server A" on "connection A" or "server B" on "connection F."

The connection availability 365 indicates whether the connection associated with the record is available for use by a request or is in use by a request. The connection status 370 indicates whether the connection is good (valid) or stale (not good or has encountered an error).

Although the connection pool 172 in FIG. 3 is illustrated as a single pool, in other embodiments, the records 305, 310, 315, 320, 325, 330, 335, 340, 345, and 350 may be divided into any number of pools. In an embodiment, all the records with the same target identifier 355 may be in separate pools, e.g., records 305, 310, and 315 with a target identifier 355 of "server A" may be in one pool, records 320, 325, 330, and 335 with a target identifier 355 of "server B" may be in another pool, and records 340, 345, and 350 with a target identifier 355 of "server C" may be in still another pool. In another embodiment, all of the records with the same attributes 360 may be in separate pools 172, e.g., records 305 and 330 with attributes 360 of "SSL" may be in one pool, records 310 and 330 with attributes 360 of "non-SSL" may be in another pool, records 315 and 340 with attributes 360 of "2-phase commit" may be in another pool. In another embodiment, all records with a connection availability 365 of available are in an available pool while all records with a connection availability 365 of in use are in an in use pool, and the controller 170 moves a connection from the available pool to the in use pool when the controller 170 sends the request to the target server computer system 132, and the controller 170 moves the connection back from the in use pool to the available pool when the request successfully completes.

FIG. 4 depicts a block diagram of a data structure for connection statistics 174, according to an embodiment of the invention. The connection statistics 174 include a number of stale connections 405, which indicates the number of stale connections that requests processed by the controller 170 encountered during the time period 425. The connection statistics 174 further include a number of good connections 410, which indicates the number of good connections that requests processed by the controller 170 encountered during the time period 425. The connection statistics 174 further include a ratio 415, which indicates the ratio of the number of stale connections 405 to the number of good connections 410 during the time period 425. The connection statistics 174 further includes an adaptive threshold 420, which indicates a threshold that the controller 170 compares against the number of stale connections 405 when determining whether to perform passive or active connection pool recovery, as further described below with reference to FIG. 7. The connection statistics 174 further include a time period 425, which indicates a period or length of time in which the fields 405, 410, and 415 are collected. After expiration of the time period 425, the controller 170 resets the number of stale connections 405, the number of good connections 410, and the ratio 415 to zero, and then once again begins counting and calculating them.

FIG. 5 depicts a block diagram of an example data structure for rules 178, according to an embodiment of the invention. The rules 178 include example rules 505, 510, 515, and 520. Each of the example rules 505, 510, 515, and 520 includes a stale to good ratio comparison statement field 525, an adaptive threshold comparison statement field 530, and an adaptive threshold adjustment amount field 535.

The stale to good ratio comparison statement 525 includes a comparison operator and a number for comparing against the ratio 415. The adaptive threshold comparison statement 530 includes a comparison operator and a number for comparing against the adaptive threshold 420. The adaptive threshold adjustment amount 535 includes a number for adding to or subtracting from the adaptive threshold 420 if the rule is satisfied. The controller 170 changes the adaptive threshold 420 by the adaptive threshold adjustment amount 535 specified by a rule (rule 505, 510, 515, or 520) if the ratio 415 of the number of stale connections to a number of good connections encountered during the time period 425 satisfies the ratio comparison statement 525 specified by the rule 178 and if the adaptive threshold 420 satisfies the threshold comparison statement 530.

Figure 6:
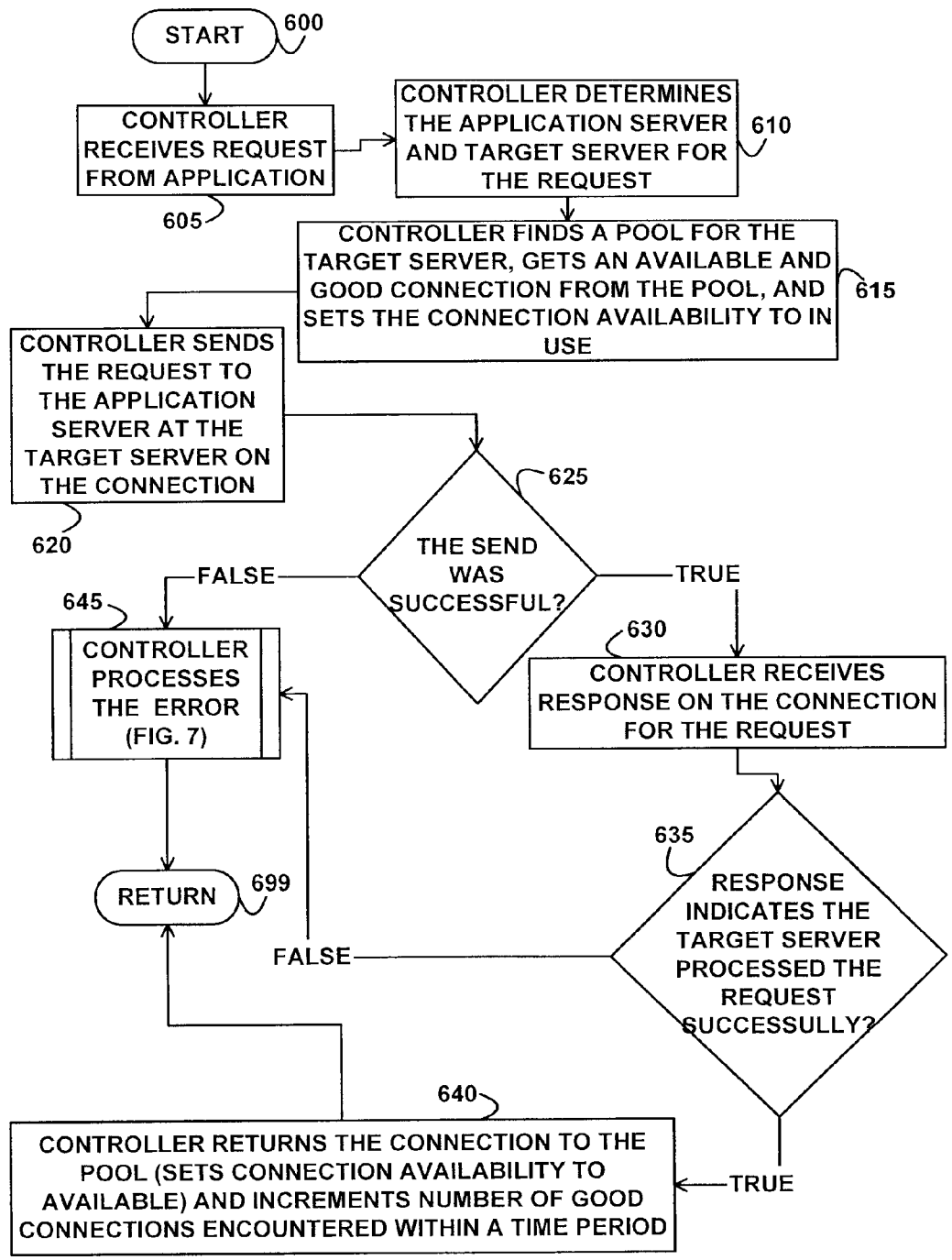
FIG. 6 depicts a flowchart of example processing for sending requests from a client to a server, according to an embodiment of the invention.

FIG. 6 depicts a flowchart of example processing for sending requests from a client computer system 100 to a server computer system 132, according to an embodiment of the invention. Control begins at block 600. Control then continues to block 605 where the controller 170 receives a request from the application 176. The controller 170 determines that the request can be fulfilled by sending a request to an application server 190. Control then continues to block 610 where the controller 170 determines or selects an application server 190 and a target server computer system 132 to receive the request. Control then continues to block 615 where the controller 170 finds a pool 172 that contains connections for the target server computer system 132, finds and retrieves a connection that has a connection availability 365 of available and a connection status 370 of good (not stale) from the pool 172. The controller 170 further sets the connection availability 365 in the pool 172 that is associated with the retrieved connection to indicate that the connection is now in use and is no longer available for other requests.

Control then continues to block 620 where the controller 170 sends the request to the application server 190 at the target server computer system 132 on the connection, meaning that the controller 170 sends the connection identifier 205 of the connection with the request to application server 190 at the target server computer system 132. Control then continues to block 625 where the controller 170 determines whether the send operation of the request to the application server 190 at the target server computer system 132 was successful.

If the determination at block 625 is true, then the send operation of the request to the application server 190 at the target server computer system 132 was successful, so control continues to block 630 where the controller 170 receives a response to the request on the connection from the target server computer system 132. The response includes an identifier of the request and the connection identifier 205 that was sent with the request to the target server computer system 132. Control then continues to block 635 where the controller 170 determines whether the response indicates that the application server 190 at the target server computer system 132 processed the request successfully. In various embodiments, the application server 190 may process the request successfully by retrieving data and sending the data to the application 176 in response to the request, by updating, inserting, or deleting data at the server computer system 132 in response to the request, or any other appropriate processing of the request.

If the determination at block 635 is true, then the application server 190 at the target server computer system 132 processed the request successfully, so control continues to block 640 where the controller 170 returns the connection to the pool 172, meaning that the controller 170 sets the connection availability 365 to indicate that the connection is once again available. The controller 170 further increments the number of good connections 410 encountered by the controller 170 during the time period 425. If the time period 425 has expired, the controller 170 resets the numbers 405, 410 and the ratio 415 to zero. Control then continues to block 699 where the logic of FIG. 6 returns.

If the determination at block 635 is false, then the application server 190 at the target server computer system 132 did not process the request successfully, so control continues to block 645 where the controller 170 processes the error that occurred at the target server computer system 132, as further described below with reference to FIG. 7. Control then continues to block 699 where the logic of FIG. 6 returns.

If the determination at block 625 is false, then the send operation of the request to the application server 190 at the target server computer system 132 was not successful, so control continues to block 645 where the controller 170 processes the error encountered by the send operation, as further described below with reference to FIG. 7. Control then continues to block 699 where the logic of FIG. 6 returns.

Figure 7:
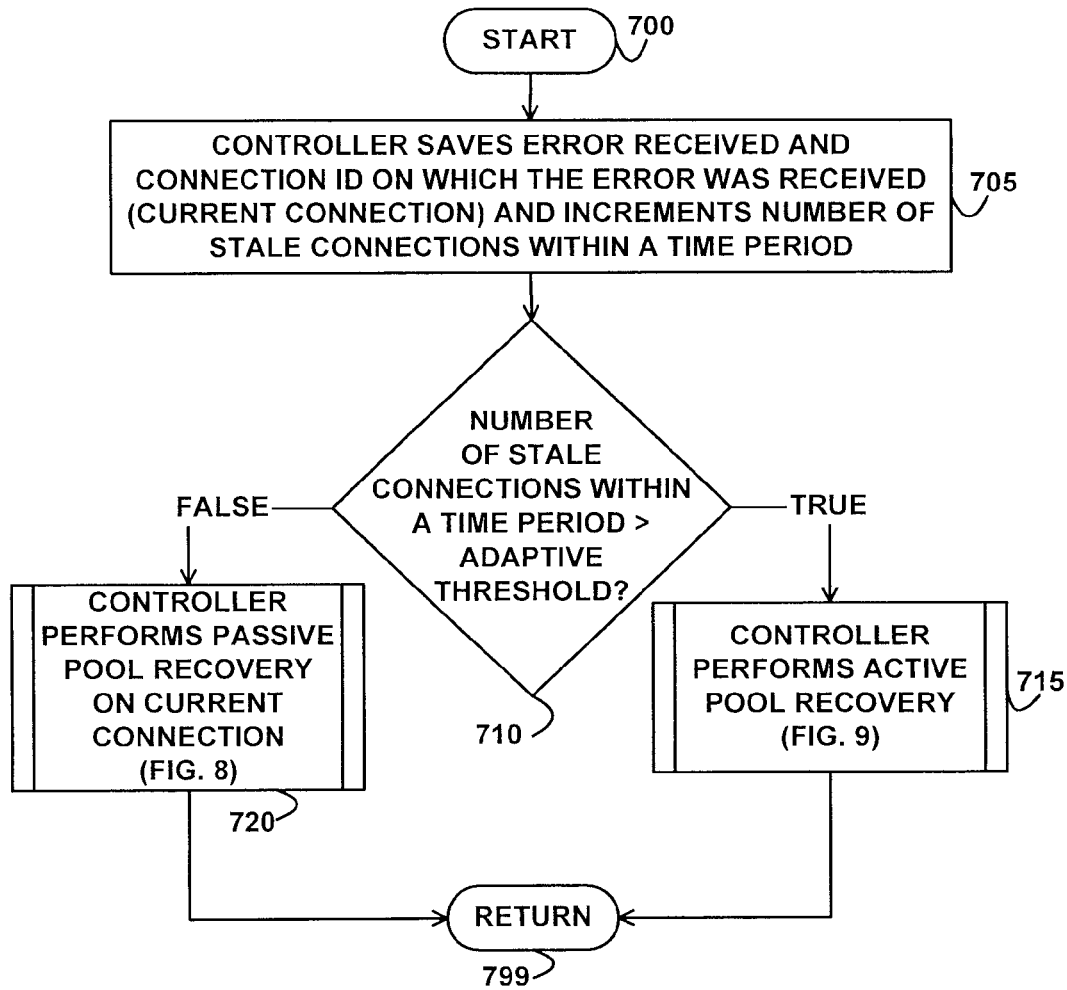
FIG. 7 depicts a flowchart of example processing for determining whether to perform passive or active connection pool recovery, according to an embodiment of the invention.

FIG. 7 depicts a flowchart of example processing for determining whether to perform passive or active connection pool recovery, according to an embodiment of the invention. Control begins at block 700. Control then continues to block 705 where the controller 170 saves the error received and the connection identifier 205 on which the error was received or detected (the current connection) and increments the number of stale connections encountered 405 within the time period 425. Control then continues to block 710 where the controller 170 determines whether the number of stale connections 405 that have been encountered by the controller 170 within the time period 425 is greater than the adaptive threshold 420.

Figure 9:
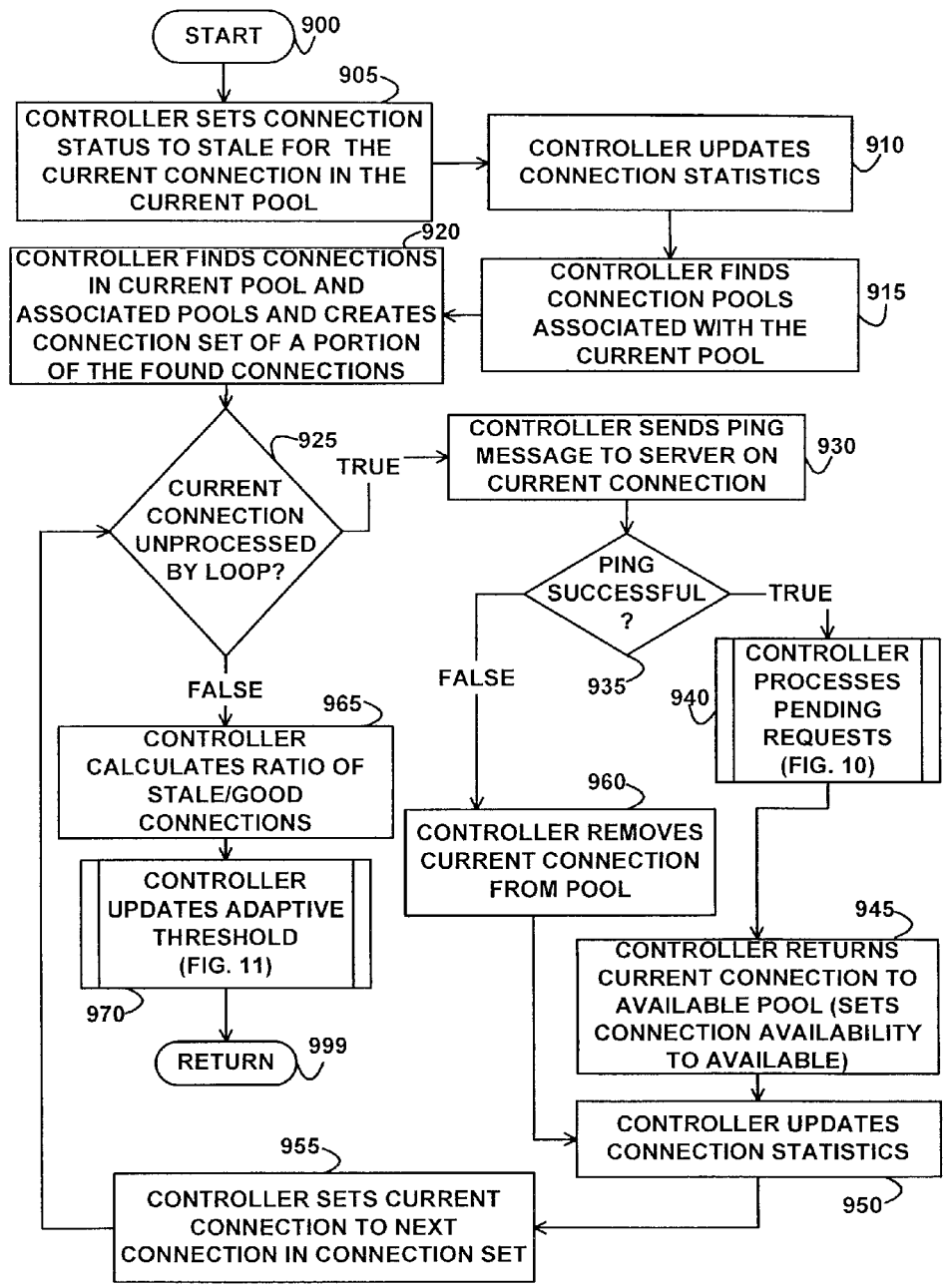
FIG. 9 depicts a flowchart of example processing for performing active connection pool recovery, according to an embodiment of the invention.

If the determination at block 710 is true, then the number of stale connections encountered 405 by the controller 170 while sending requests to and receiving responses from the server computer system 132 during the time period 425 is greater than the adaptive threshold 420, so control continues to block 715 where the controller 170 performs active pool recovery on all of the connections within the connection pool 172 and optional associated connection pools 172, as further described below with reference to FIG. 9. Control then continues to block 799 where the logic of FIG. 7 returns.

Figure 8:
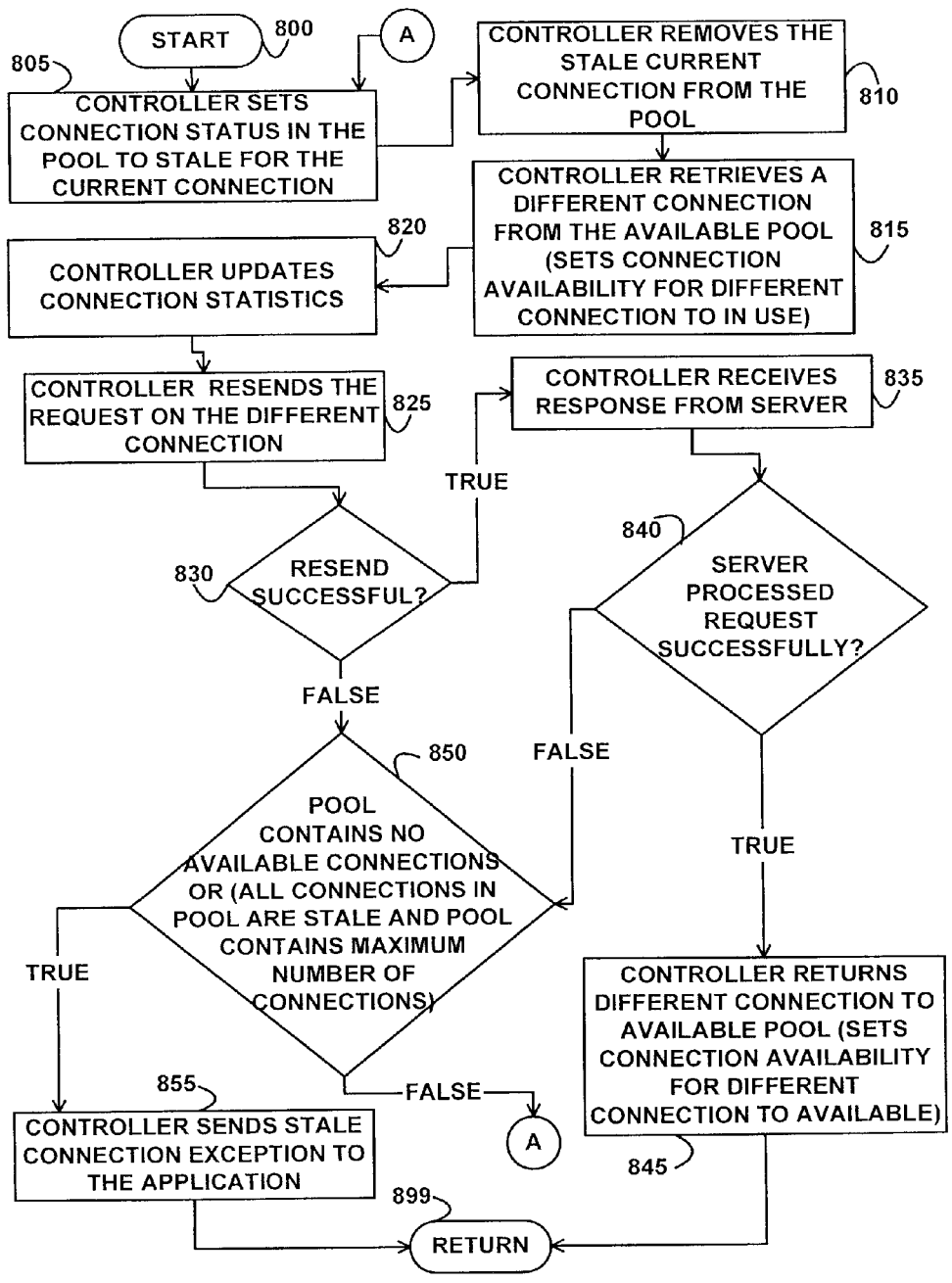
FIG. 8 depicts a flowchart of example processing for performing passive connection pool recovery, according to an embodiment of the invention.

If the determination at block 710 is false, then the number of stale connections encountered 405 by the controller 170 while sending requests to and receiving responses from the target server computer system 132 during the time period 425 is not greater than the adaptive threshold 420, so control continues to block 720 where the controller 170 performs passive pool recovery on only the current connection in the connection pool 172 (but not on the other connections in the connection pool 172), as further described below with reference to FIG. 8. Control then continues to block 799 where the logic of FIG. 7 returns.

FIG. 8 depicts a flowchart of example processing for performing passive connection pool recovery on only the current stale connection, according to an embodiment of the invention. Control begins at block 800. Control then continues to block 805 where the controller 170 sets the connection status 370 to stale for the current connection in the pool 172. Control then continues to block 810 where the controller 170 removes the stale current connection from the pool 172 by deleting the record associated with the connection from the pool 172. Control then continues to block 815 where the controller 170 retrieves a different available connection (with a connection availability 365 of available) from the pool 172 and sets the connection availability 365 to indicate that the different connection is now in use.

Control then continues to block 820 where the controller 170 updates the connection statistics 174 by incrementing the number of stale connections encountered 405 and calculating the ratio of the number of stale connections to the number of good connections 415. If the time period 425 has expired, the controller 170 resets the number of stale connections 405, the number of good connections 410, and the ratio 415 to zero. Control then continues to block 825 where the controller 170 resends the request to the application server 190 at the server computer system 132 on the different connection that was previously retrieved at block 815.

Control then continues to block 830 where the controller 170 determines whether the resend of the request to the application server 190 at the server computer system 132 was successful. If the determination at block 830 is true, then the resend of the request to the application server 190 at the server computer system 132 was successful, so control continues to block 835 where the controller 170 receives a response to the request from the server computer system 132. Control then continues to block 840 where the controller 170 determines whether the response indicates that the application server 190 at the server computer system 132 processed the request successfully. If the determination at block 840 is true, then the response to the request indicates that the application server 190 at the server computer system 132 processed the request successfully, so control continues to block 845 where the controller 170 returns the different connection to the connection pool 172 by setting the connection availability 365 for the different connection to indicate that the different connection is once again available and not in use. Control then continues to block 899 where the logic of FIG. 8 returns If the determination at block 840 is false, then the response to the request indicates that the application server 190 at the server computer system 132 processed the request unsuccessfully or encountered an error, so control continues to block 850 where the controller 170 determines whether the connection pool 172 contains no available connections or (all of the connections in the connection pool 172 are stale and the connection pool 172 contains the maximum number of connections, i.e., the connection pool 172 cannot be increased in size). If the determination at block 850 is true, then the connection pool 172 contains no available connections or all available connections in the connection pool 172 are stale and the connection pool 172 cannot be increased in size, so control continues to block 855 where the controller 170 sends a stale connection exception to the application 176. Control then continues to block 899 where the logic of FIG. 8 returns.

If the determination at block 850 is false, then the connection pool 172 has an available connection or can be increased in size, so control returns to block 805, as previously described above.

If the determination at block 830 is false, then the resend was not successful, so control continues to block 850, as previously described above.

FIG. 9 depicts a flowchart of example processing for performing active connection pool recovery on all connections in the current connection pool 172 and optional associated connection pools 172, according to an embodiment of the invention. Control begins at block 900. Control then continues to block 905 where the controller 170 sets the connection status 370 to stale for the current connection in the current connection pool 172. Control then continues to block 910 where the controller 170 updates the connection statistics 174 by incrementing the number of stale connections 405 encountered by the controller 170 while sending requests and/or receiving responses to requests and calculating the ratio 415 of the number of stale connections to the number of good connections. If the time period 425 has expired, the controller 170 resets the number of stale connections 405, the number of good connections 410, and the ratio 415 to zero.

Control then continues to block 915 where the controller 170 determines or finds connection pools 172 that are associated with the current connection pool 172. Connection pools 172 are associated if they contain connections that connect to the same target server 355. Control then continues to block 920 where the controller 170 finds all connections in the current pool 172 and the associated pools 172, selects a portion (some or all) of the found connections, and creates a connection set of the portion of the found connections. In an embodiment, the controller 170 selects the portion and creates the connection set to contain all of the found connections. In another embodiment, the controller 170 selects the portion and creates the connection set to contain all connections with a connection availability 365 of available. In another embodiment, the controller 170 selects the portion and creates the connection set to contain all connections with a connection availability 365 of available and a connection status 370 of good. The controller 170 performs active pool recovery on the connections in the connection set, as further described below.

Control then continues to block 925 where the controller 170 determines whether the current connection in the connection set is unprocessed (whether recovery has not yet been done) by the logic loop of FIG. 9 that starts with block 925. If the determination at block 925 is true, then the current connection in the connection set has not yet been processed, so control continues to block 930 where the controller 170 sends a ping message to the target server computer system 132 identified by the target identifier 355 on the current connection. The target server computer system 132 to which the ping message is sent may be the same or a different server computer system 132 than the server computer system 132 associated with the stale connection (that was encountered and that caused the active pool recovery to be initiated) because the controller 170 is sending ping messages to all connections in the pool 172 that contained the stale connection and the associated pools 172. A ping is a network message that tests the availability and existence of the server computer system 132 on the network 130. The ping does not necessarily test the availability or functioning of the application server 190 within the target server computer system 132 and does not rely on the existence of any data or resources that the application server 190 uses or accesses.

Control then continues to block 935 where the controller 170 determines whether the ping message is successful, i.e., whether the target server computer system 132 is connected to the network 130 and able to respond to network messages, and whether the controller 170 received a response to the ping message from the target server computer system 132 identified by the target identifier 355. If the determination at block 935 is true, then the ping message is successful and the controller 170 received a successful response to the ping message, so control continues to block 940 where the controller 170 processes pending requests, as further described below with reference to FIG. 10. Control then continues to block 945 where the controller 170 returns the current connection to the available connection pool 172 by setting the connection availability 365 to indicate that the connection is available. Control then continues to block 950 where the controller 170 updates the connection statistics 174, by incrementing the number of stale connections 405 if the ping message was unsuccessful, by incrementing the number of good connections 410 if the ping message was successful, and by calculating the ratio 415.

Control then continues to block 955 where the controller 170 sets the current connection to be the next connection in the connection set. Control then returns to block 925 where the controller 170 determines whether the current connection exists in the connection set and is unprocessed by the loop in the logic of FIG. 9 that starts at block 925, as previously described above.

If the determination at block 935 is false, then the ping message was not successful (the target server computer system 132 did not respond to the ping message or the response indicates an error), so control continues to block 960 where the controller 170 removes the current connection from the connection pool 172 by deleting the record associated with the connection from the available connection pool 172. Control then continues to block 950, as previously described above.

If the determination at block 925 is false, then all of the connections in the connection set have been processed by the logic of FIG. 9, so control continues to block 965 where the controller 170 calculates the ratio of the number of stale connections to good connections 415. Control then continues to block 970 where the controller 170 updates the adaptive threshold 420, as further described below with reference to FIG. 11. Control then continues to block 999 where the logic of FIG. 9 returns.

Figure 10:
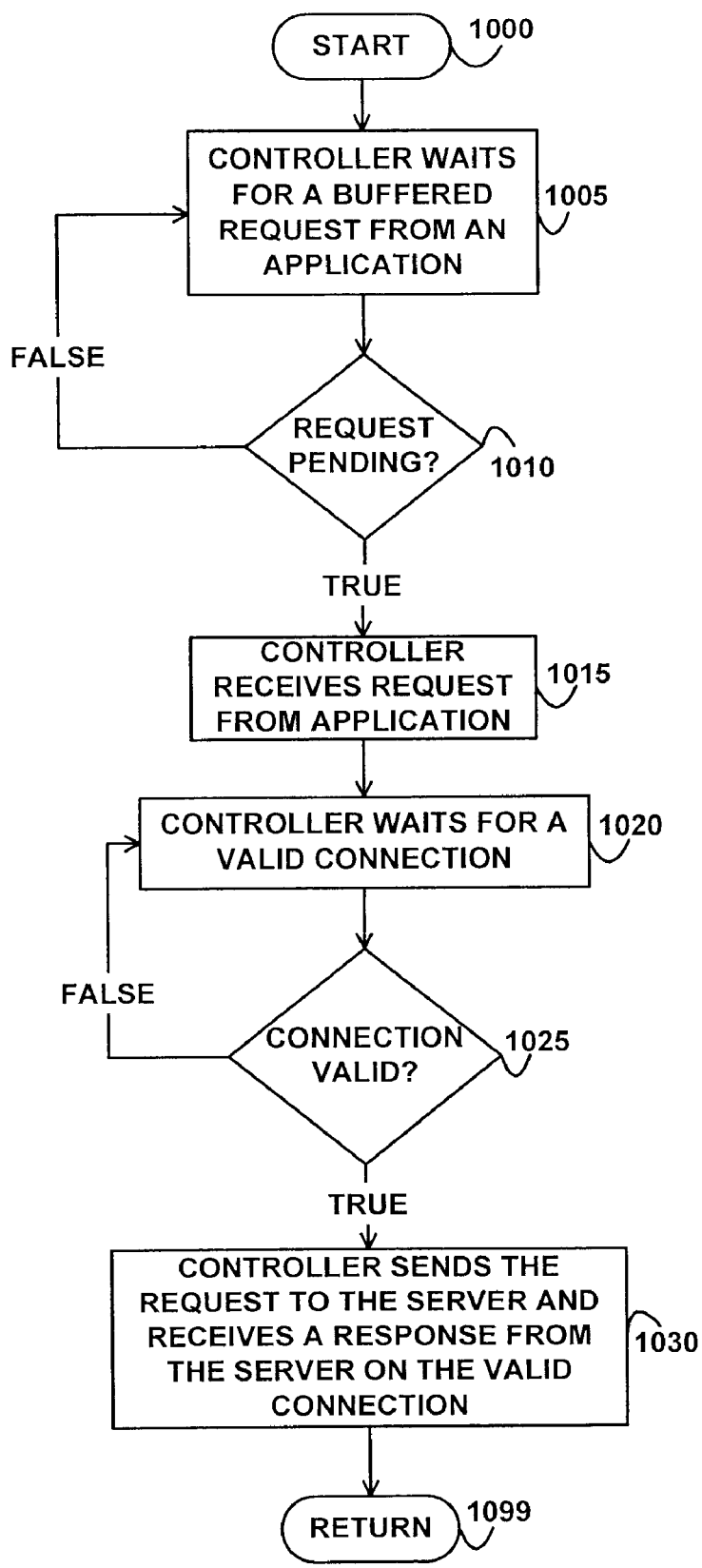
FIG. 10 depicts a flowchart of example processing for handling pending requests during active connection pool recovery, according to an embodiment of the invention.

FIG. 10 depicts a flowchart of example processing for handling pending requests during active connection pool recovery, according to an embodiment of the invention. Control begins at block 1000. Control then continues to block 1005 where the controller 170 waits for a buffered request from the application 176. Control then continues to block 1010 where the controller 170 determines whether a request is pending from the application 176. If the determination at block 1010 is true, then a request from the application 176 is pending, so control continues to block 1015 where the controller 170 receives the request from the application 176. Control then continues to block 1020 where the controller 170 waits for a valid connection (a connection availability 365 of available and a connection status 370 of good) in the connection pool 172. Control then continues to block 1025 where the controller 170 determines whether a valid connection (a connection availability 365 of available and a connection status 370 of good) exists in the connection pool 172.

If the determination at block 1025 is true, then an available and good connection exists in the connection pool 172, so control continues to block 1030 where the controller 170 sends the request to the server computer system 132 and receives a response from the server computer system 132 on the available and good connection. The controller 170 passes the connection identifier 205 with the request, and the application server finds the resources 192 that are allocated to the passed connection identifier 205 and uses the allocated resources 192 to process the request. Control then continues to block 1099 where the logic of FIG. 10 returns.

If the determination at block 1025 is false, then a valid connection does not exist in the connection pool 172, so control returns to block 1020 where the controller 170 once again waits for a valid connection, as previously described above.

If the determination at block 1010 is false, then a request is not pending from the application 176, so control returns to block 1005 where the controller 170 once again waits for a buffered request, as previously described above.

Figure 11:
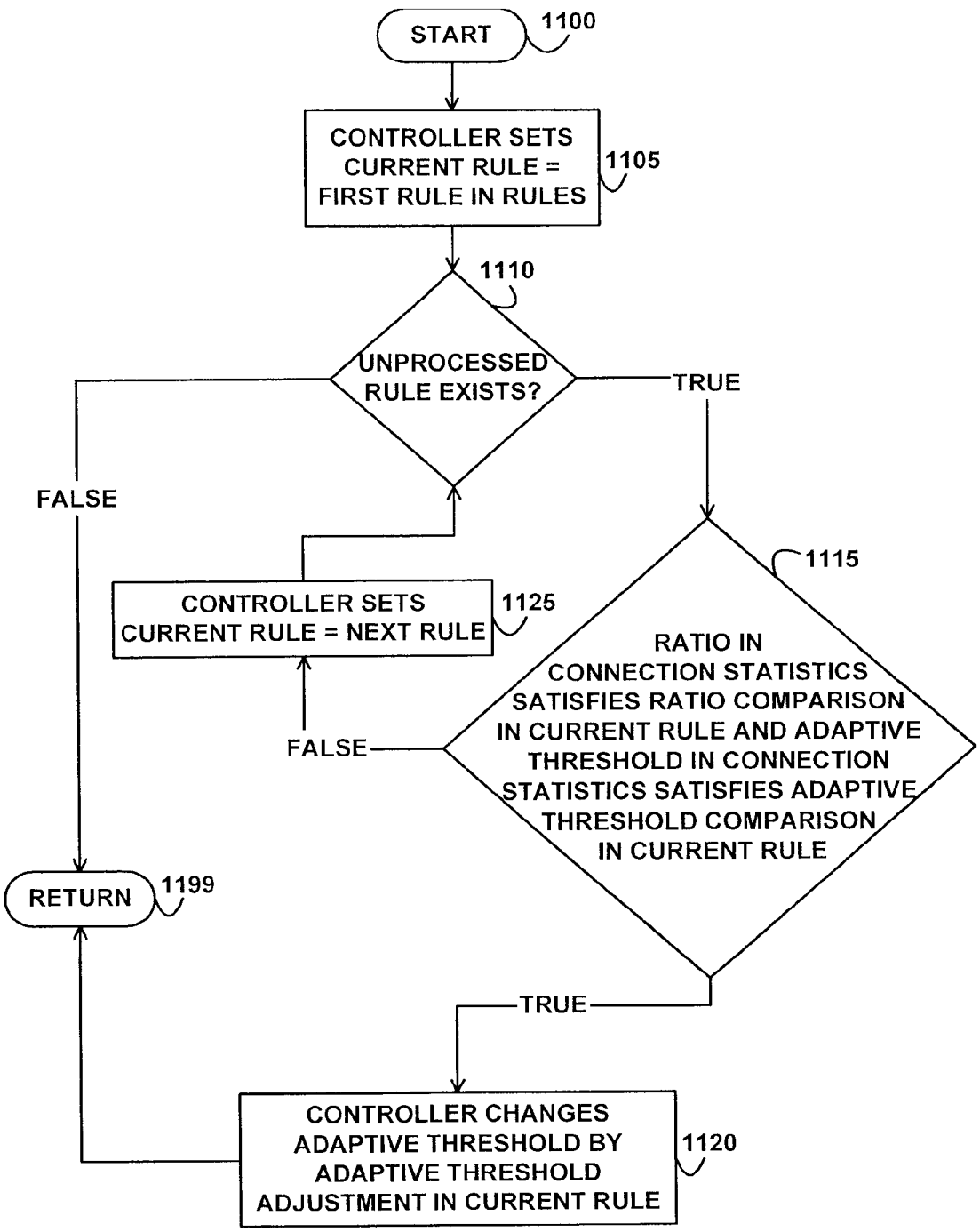
FIG. 11 depicts a flowchart of example processing for updating an adaptive threshold during active connection pool recovery, according to an embodiment of the invention.

FIG. 11 depicts a flowchart of example processing for updating the adaptive threshold 420 during active connection pool recovery, according to an embodiment of the invention. Control begins at block 1100. Control then continues to block 1105 where the controller 170 sets the current rule to be first rule in the rules 178. Control then continues to block 1110 where the controller 170 determines whether a rule exists in the rules 178 that is unprocessed by the loop in the logic of FIG. 11 that starts at bock 1110.

If the determination at block 1110 is true, then a rule exists in the rules 178 that is unprocessed by the logic of FIG. 11, so control continues to block 1115 where the controller 170 determines whether the ratio 415 of the number of stale connections to the number of good connections encountered by the controller 170 while sending requests and/or receiving responses to the requests within the time period 425 in the connection statistics 174 satisfies the ratio comparison statement 525 in the current rule and the adaptive threshold 420 in the connection statistics 174 satisfies the adaptive threshold comparison statement 530 in the current rule. If the determination at block 1115 is true, then the current rule is satisfied by the connection statistics 174, so control continues to block 1120 where the controller 170 changes (adds or subtracts) the adaptive threshold 420 by the adaptive threshold adjustment amount 535 in the current rule. Control continues to block 1199 where the logic of FIG. 11 returns.

If the determination at block 1115 is false, then the current rule is not satisfied by the connection statistics 174, so control continues to block 1125 where the controller 170 sets the current rule to be the next rule in the rules 178. Control then returns to block 1110 where the controller 170 determines whether any unprocessed rules 178 exist, as previously described above.

If the determination at block 1110 is false, then a rule does not exist in the rules 178 that is unprocessed by the logic of FIG. 11, so control continues to block 1199 where the logic of FIG. 11 returns.

Using the example of FIGS. 4 and 5, the ratio 415 of "0.7" is not greater than the ratio comparative statement value 525 of "0.8" so the rule 505 is not satisfied; the ratio 415 of "0.7" is not less than the ratio comparative statement value "0.2" so the rule 515 is not satisfied; and the ratio 415 of "0.7" is not less than the ratio comparative statement value 525 of "0.4" so the rule 505 is not satisfied. But, the ratio 415 of "0.7" is greater than the ratio comparative statement value "0.6," and the adaptive threshold 420 of "6" is greater than the adaptive threshold comparative statement value 530 of "1," so the rule 510 is satisfied. In response to the satisfaction of the rule 510, the controller 170 changes the adaptive threshold 420 by the adaptive threshold adjustment amount 535 of "−1" specified by the rule 510. That is, the controller 170 sets the adaptive threshold 420 to be 6−1=5.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, the invention may be practiced without these specific details. In other instances, well-known circuits, structures, and techniques have not been shown in detail in order not to obscure the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A method comprising:
   in response to a request, selecting a current connection from a pool, wherein the pool comprises a plurality of connections to a server, wherein a plurality of applications share the pool of the plurality of connections;
   deciding whether the current connection is;

if the current connection is stale, determining whether a number of stale connections encountered during a time period is greater than an adaptive threshold;

if the determining is true, performing recovery on all of the plurality of connections in the pool, wherein the performing the recovery on all of the plurality of connections in the pool further comprises sending a ping message to the server on each of the plurality of connections and removing the connections from the pool for which the ping message is unsuccessful;

if the determining is false, performing recovery on the current connection; and changing the adaptive threshold by an amount specified by a rule if a ration to the number of stale connections to a number of good connections encountered during the time period satisfies a ration comparison statement specified by the rule.

2. The method of claim 1, wherein the deciding further comprises:

sending the request to the server via the current connection; and detecting whether the sending encountered an error.

3. The method of claim 2, wherein the deciding further comprises:

receiving a response from the server via the current connection; and detecting whether the response indicates that the request encountered an error at the server.

4. The method of claim 1, further comprising:

if the determining is true, finding an associated pool, wherein the associated pool has a second plurality of connections that connect to the server, and performing recovery on all of the second plurality of connections in the associated pool.

5. The method of claim 2, wherein the performing the recovery on the current connection further comprises:

removing the current connection from the pool;

selecting a different connection from the pool; and resending the request to the server on the different connection.

6. The method of claim 1, wherein the changing the adaptive threshold further comprises:

Changing the adaptive threshold by the amount specified in the rule if the adaptive threshold satisfies a threshold comparison statement specified by the rule.

7. A computer-readable storage medium encoded with instructions, wherein the instructions when executed comprise:

in response to receiving a request, selecting a current connection from a pool, wherein the pool comprises a plurality of connections to a server, wherein a plurality of applications share the pool of the plurality of connections;

deciding whether the current connection is stale;

if the current connection is stale, determining whether a number of stale connections encountered during a time period is greater than an adaptive threshold; if the determining is true, performing recovery on all of the plurality of connections in the pool, wherein the performing the recovery on all of the plurality of connections in the pool further comprises sending a ping message to the server on each of the plurality of connections and removing the connections from the pool for which the ping message is unsuccessful;

if the determining is false, performing recovery on only the current connection; and changing the adaptive threshold by an amount specified by a rule if a ratio of the number of stale connections to a number of good connections encountered during the time period satisfies a ratio comparison statement specified by the rule.

8. The computer-readable storage medium of claim 7, wherein the deciding further comprises:

sending the request to the server via the current connection; and detecting whether the sending encountered an error.

9. The computer-readable storage medium of claim 8, wherein the deciding further comprises:

receiving a response from the server via the current connection; and detecting whether the response indicates that the request encountered an error at the server.

10. The signal computer-readable storage medium of claim 7, further comprising:

if the determining is true, finding an associated pool, wherein the associated pool has a second plurality of connections that connect to the server, and performing recovery on all of the second plurality of connections in the associated pool.

11. The computer-readable storage medium of claim 8, wherein the performing the recovery on only the current connection further comprises:

removing the current connection from the pool;

selecting a different connection from the pool; and resending the request to the server on the different connection.

12. The computer-readable storage medium of claim 7, wherein the changing the adaptive threshold further comprises:

changing the adaptive threshold by the amount specified in the rule if the adaptive threshold satisfies a threshold comparison statement specified by the rule.

13. A method for configuring a computer, comprising:

configuring the computer to, in response to receiving a request, select a current connection from a pool, wherein the pool comprises a plurality of connections to a server, wherein a plurality of applications share the pool of the plurality of connections;

configuring the computer to decide whether the current connection is stale;

configuring the computer to, if the current connection is stale, determine whether a number of stale connections encountered during a time period is greater than an adaptive threshold;

configuring the computer to, if the determining is true, perform recovery on all of the plurality of connections in the pool, wherein the configuring the computer to perform the recovery on all of the plurality of connections in the pool further comprises configuring the computer to send a ping message to the server on each of the plurality of connections and configuring the computer to remove the connections from the pool for which the ping message is unsuccessful;

configuring the computer to, if the determining is false, perform recovery on only the current connection; and configuring the computer to change the adaptive threshold by an amount specified by a rule if a ratio of the number of stale connections to a number of good connections encountered during the time period satisfies a ratio comparison statement specified by the rule and to change the adaptive threshold by the amount specified in the rule if the adaptive threshold satisfies a threshold comparison statement specified by the rule.

14. The method of claim 13, wherein the configuring the computer to decide further comprises:
   configuring the computer to send the request to the server via the current connection;
   configuring the computer to detect whether the send of the request encountered an error;
   configuring the computer to receive a response from the server via the current connection; and
   configuring the computer to detect whether the response indicates that the request encountered an error at the server.

15. The method of claim 13, further comprising:
   configuring the computer to, if the determining is true, find an associated pool, wherein the associated pool has a second plurality of connections that connect to the server, and perform recovery on all of the second plurality of connections in the associated pool.

16. The method of claim 13, wherein the configuring the computer to perform the recovery on only the current connection further comprises:
   configuring the computer to remove the current connection from the pool;
   configuring the computer to select a different connection from the pool; and
   configuring the computer to resend the request to the server on the different connection.

* * * * *